United States Patent
Toval et al.

(10) Patent No.: US 10,410,244 B2
(45) Date of Patent: Sep. 10, 2019

(54) BEHAVIORAL CONTENT DISCOVERY

(71) Applicants: Assaf Toval, Herzeliya (IL); Kfir Moyal, Tel-Aviv (IL)

(72) Inventors: Assaf Toval, Herzeliya (IL); Kfir Moyal, Tel-Aviv (IL)

(73) Assignee: BI SCIENCE (2009) LTD, Tel-Aviv (IL)

(*) Notice: Subject to any disclaimer, the term of this patent is extended or adjusted under 35 U.S.C. 154(b) by 663 days.

(21) Appl. No.: 14/540,431

(22) Filed: Nov. 13, 2014

(65) Prior Publication Data
US 2015/0206176 A1  Jul. 23, 2015

Related U.S. Application Data

(60) Provisional application No. 61/903,410, filed on Nov. 13, 2013.

(51) Int. Cl.
G06Q 30/02 (2012.01)

(52) U.S. Cl.
CPC ..... *G06Q 30/0245* (2013.01); *G06Q 30/0261* (2013.01)

(58) Field of Classification Search
USPC .......................................... 705/14.53; 725/13
See application file for complete search history.

(56) References Cited

U.S. PATENT DOCUMENTS

| 2007/0088821 A1* | 4/2007 | Sankuratripati ....... G06Q 30/02 709/224 |
| 2008/0228537 A1* | 9/2008 | Monfried ............... G06Q 30/02 705/14.53 |
| 2013/0019258 A1* | 1/2013 | Bhatia .................. H04N 21/252 725/13 |

* cited by examiner

*Primary Examiner* — Saba Dagnew
(74) *Attorney, Agent, or Firm* — Smith Tempel Blaha LLC; Gregory Scott Smith (57) ABSTRACT

A system and a method for automatically collecting content, the method comprising the steps of: defining a plurality of content sites, creating a collection of virtual agents data including user characteristic data and user behavioral data, presenting the collection of virtual agents to the plurality of content sites; receiving content from the visited internet site; and storing the received content or presenting it to a user.

6 Claims, 7 Drawing Sheets

BEHAVIORAL CONTENT DISCOVERY

CROSS-REFERENCE TO RELATED APPLICATIONS

This application is a non-provisional application being filed under 37 CFR 1.53(b) and 35 USC 111, claiming the benefit of the priority date of the U.S. Provisional Application for patent that was filed on Nov. 13, 2013 and assigned Ser. No. 61/903,410, which is hereby incorporated by reference.

FIELD

The method and apparatus disclosed herein are related to the field of surveying and measuring Internet advertisement effectiveness and efficiency and, more particularly, but not exclusively, to emulating a user behavior and characteristics while performing Internet advertisement survey.

BACKGROUND

Personalized advertisement in the Internet is well known in the art. Personalized advertisement adapts the advertisement presented to a user visiting a web page according to the characteristics of the particular user. Therefore, when surfing the Internet and visiting various web pages, different users are presented with different advertisements. The visited website should therefore identify the characteristics of each user visiting the website. There are many methods for online tracking of a user, studying the user's online behavior, analyzing the user's characteristics, and presenting the relevant information to the website. These methods are evolving continuously, affecting the offering of advertisements to the visiting user and the user's online experience.

Internet advertisement surveys study the offering of advertisements presented to various users. The advertisement survey enables the advertiser to understand how a user experiences Internet advertising and the impact of a particular ad in view of the overall offering of advertisements. An advertisement survey should therefore focus on the relative impact of a particular advertisement on a particular type of user. However, Internet advertisement surveys do not enable the surveying advertiser to adapt the survey to the particular characteristics of the audience to which a particular advertisement is targeted. There is thus a need in the art for, and it would be highly advantageous to have, a method and a system for Internet advertisement surveys devoid of the above limitations.

SUMMARY OF EXEMPLARY EMBODIMENTS

According to one exemplary embodiment there is provided a method, a software program, and a system, for collecting content, the method including the steps of: receiving from a first user a content location, the Internet location being one or more of an Internet address, an Internet link, and a universal resource locator (URL), a user location and user data. The user location may include the geographical location of a second user. The user data may include one or more characteristic of the second user as well as behavioral data of the second user. The method includes accessing from an Internet server, a destination Internet site according to one or more of the content location and user location, receiving content from the destination internet site, and presenting the content to the first user, and/or storing the content. The step of accessing from an Internet server a destination Internet site uses the content location, an Internet Protocol (IP) address representing the user location, and the user data.

According to another exemplary embodiment, there is provided a method, a software program, and a system, for collecting content. The method includes the steps of: creating a content collection including a plurality of content locations where each of the content locations includes one or more of an Internet address, an Internet link, and a universal resource locator (URL). The method includes creating a user collection including a plurality of virtual agents data where each virtual agent data includes one or more of the user characteristic data and user behavioral data in a data structure comprehensible by the content site. The method also includes automatically accessing, by an Internet server using the virtual agent data, a content location in the content collection, receiving content from the destination internet site, repeating the above steps, and presenting the content to a user, and/or storing the content. These steps may be repeated for a plurality of content locations and a plurality of virtual agent data.

According to yet another exemplary embodiment, there is provided a method, a software program, and a system, for collecting content. In this embodiment, the method includes the step of receiving a content location, wherein the content location may be any one of an Internet address, an Internet link, and a universal resource locator (URL). The method also includes receiving a plurality of user data, where the user data includes one or more characteristic of the second user and/or behavioral data of the second user. The method continues by accessing the content location from an Internet server, retrieving at least one advertisement from the content location, and presenting the content to the first user, and/or storing the content. The step of accessing the content location is repeated, each time using a different user data from the plurality of user data.

According to still another exemplary embodiment, there is provided a method, a software program, and a system, for collecting content by additionally including the steps of receiving from a user at least one value for at least one parameter, and presenting the content to the according to the parameters.

Further, according to another exemplary embodiment, there is provided a method, a software program, and a system, for collecting content additionally including the steps of receiving from a user at least one user-characterizing content-location, and accessing the user-characterizing content-locations before the step of accessing the content location.

Still further, according to another exemplary embodiment, there is provided a method, a software program, and a system, for collecting content. In this embodiment, the method additionally includes the steps of receiving from a user at least one referencing content-location, and accessing the referencing content-location before the step of accessing the content location.

Yet further, according to another exemplary embodiment, there is provided a method, a software program, and a system, for collecting content. In this embodiment, the method additionally includes the steps of receiving from a user at least one keyword, receiving from a user at least one referencing content-location, accessing the referencing content-location, and presenting the keyword to the referencing content-location, where the steps of accessing the referencing content-location and presenting the keyword to the referencing content-location are performed before the step of accessing the content location.

Even further, according to another exemplary embodiment, there is provided a method, a software program, and a system, for collecting content. In this embodiment, the method additionally includes the steps of receiving from a user at least one user-characterizing IP-address, and accessing the content location via the user-characterizing IP-address.

Additionally, according to another exemplary embodiment, there is provided a method, a software program, and a system, for collecting content. In this embodiment, the method includes the steps of receiving from a user one or more user-characterizing parameters, and one or more advertisement-characterizing parameters, presenting to the user one or more advertisement-characterizing parameters associated with the user-characterizing parameters, and user-characterizing parameters associated with the advertisement-characterizing parameters.

According to still another exemplary embodiment, there is provided a method, a software program, and a system, for collecting content. In this embodiment, the method includes the steps of receiving from a user one or more user-characterizing parameters and advertisement-characterizing parameters, presenting to the user one or more statistical parameters calculated for at least one advertisement-characterizing parameter associated with the user-characterizing parameter, and/or statistical parameter calculated for at least one user-characterizing parameter associated with the advertisement-characterizing parameter.

According to another exemplary embodiment, there is provided a method, a software program, and a system, for optimizing a survey of advertisements. In this embodiment, the method includes the steps of receiving a plurality of content locations and a plurality of user data, where each pair of content location and user data includes a cell. The method continues by accessing the content location from an Internet server and presenting the user data to the content location. Further, the method retrieves at least one advertisement from the content location forming a result, repeating the above-listed steps for a first plurality of cells. The method then compares the results of the first plurality of cells forming a distribution of comparisons, selecting a second plurality of cells according to a distribution of the comparisons of cells, and repeating previous steps for the selected cells.

Unless otherwise defined, all technical and scientific terms used herein have the same meaning as commonly understood by one of ordinary skill in the relevant art. The materials, methods, and examples provided herein are illustrative only and are not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementations of the methods and systems of the various embodiments described herein involve performing or completing certain selected tasks or steps manually, automatically, or using any combination thereof. Moreover, according to actual instrumentation and equipment of the various embodiments of the method and system described herein, several selected steps could be implemented by hardware or by software on any operating system of any firmware or any combination thereof. For example, as hardware, selected steps of embodiments described herein could be implemented as a chip or a circuit. As software, selected steps of embodiments described herein could be implemented as a plurality of software instructions being executed by a computer using any suitable operating system. In any case, selected steps of the method and system of the embodiments described herein could be described as being performed by a data processor, such as a computing platform for executing a plurality of instructions.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the embodiments only, and are presented in order to provide what is believed to be the most useful and readily understood description of the principles and conceptual aspects of the embodiments. In this regard, no attempt is made to show structural details of the embodiments in more detail than is necessary for a fundamental understanding of the subject matter, the description taken with the drawings making apparent to those skilled in the art how several forms and structures may be embodied in practice.

In the drawings.

DESCRIPTION OF EXEMPLARY EMBODIMENTS

The principles and operation of a method and a system for surveying Internet advertisements according to several exemplary embodiments may be better understood with reference to the drawings and accompanying description.

Before explaining at least one embodiment in detail, it is to be understood that the embodiments are not limited to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

Various embodiments presented herein comprise a method and a system for Internet advertisement surveys, enabling the surveyor to adapt the survey to the characteristics of the target audience. Particularly, the various embodiments enable the surveyor to emulate one or more types of users and then study the advertising experience of these types of users. Particularly, the advertisement survey can be adapted to measure the impact of a particular advertisement in view of the overall advertising experience of a particular type of user. A user type is generally characterized by the user's behavior while surfing the Internet, as accumulated by the relevant Internet sites and other online mechanisms.

In this document, the terms Internet advertisement survey, Internet advertising survey, advertisement survey, advertisements survey, and advertising survey have the same meaning unless a different meaning is explicitly stated. In this respect, the terms survey, research, study, examine, measure, or map may also be used interchangeably to denote the act of investigating the distribution of advertisements presented to users according to predefined survey parameters. The term bid or bidding, especially when referring to advertisement bidding, also means auction or auctioning, as well as, real-time bidding, online ad auction, and combinations thereof.

Figure 1:
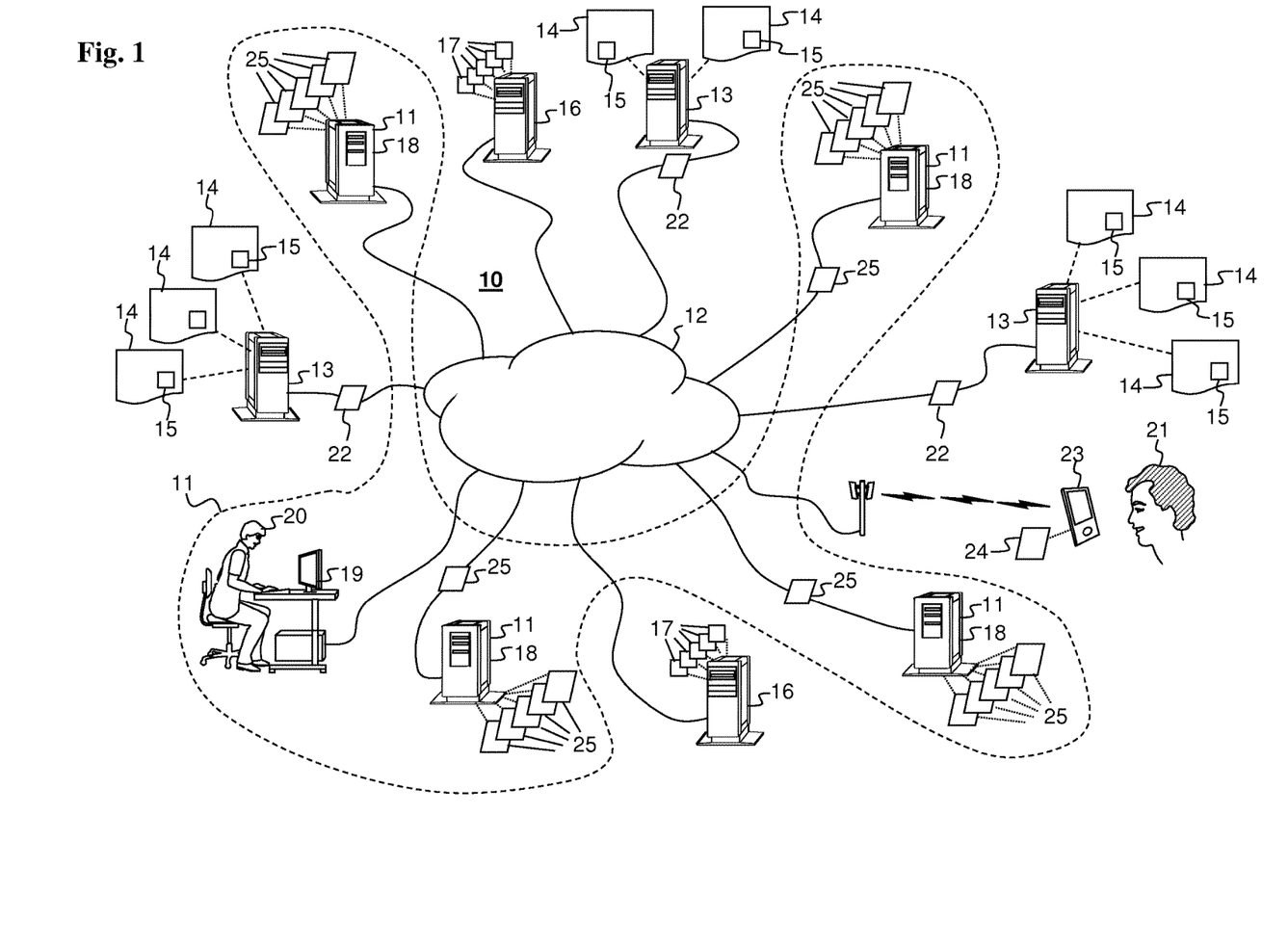
FIG. 1 is a simplified illustration of an advertisement survey environment including an advertisement survey system.

Reference is now made to FIG. 1, which is a simplified illustration of an advertisement survey environment 10 including an advertisement survey system 11 according to an exemplary embodiment.

As seen in FIG. 1, the advertisement survey environment 10 may include the following elements:

A public data communication network such as the Internet, the cloud, etc. 12;

A plurality of content servers 13 communicatively coupled to the Internet 12 and containing content 14, such as websites and web pages, and which may contain advertisement placeholders 15;

A plurality of advertising servers 16 communicatively coupled to the Internet 12 and typically containing various advertisements 17; and Advertisement survey system 11, which may include a plurality of survey servers 18 and one or more terminals or workstations 19, all communicatively coupled to the Internet 12 and typically operated by one or more users 20, who function as the operators or administrators of the advertising survey system 11.

It should be appreciated that the advertisement survey environment 10 as illustrated in FIG. 1 is simplified, and, for example, an advertising server 16 may represent a complex system of servers storing, bidding, exchanging and communicating bidding data and advertisements between advertisers and visited webpages. An advertising network is an organization operating one or more advertising servers 16. It is appreciated that advertising servers 16 can be characterized and identified according to their respective advertising network. Parameters used to characterize an advertising network include, but are not limited to: company name, type of business such as ad-network, Agency, affiliate network, redirecting URL, market category or segment (Vertical), etc.

Typically, when a user 21 accesses the Internet (referred to as surfing the Internet or web), the user also accesses Internet content 14, hosted on content server 13, such as a website or a web page that includes the web page including content 14 and an advertisement placeholder 15. The content 14, the advertisement placeholder 15, or the content server 13 contacts an advertising server 16 that is operative to place an advertisement 17 into the placeholder 15. Typically, the content server 13 hosting the content 14 and/or advertisement placeholder 15 also provides the advertising server 16 with some user information 21 pertaining to the particular user currently accessing the particular content 14. Such user information may be derived from various sources such as:

The Internet address (IP address) of the user's computing device 22.

Surf tracking data, such as the identity of a previous website visited by the user, and/or referring the user to the current website or webpage as well as the navigational actions of the user at that website.

Terms of user's interests and similar data, such as search terms, typically collected by the current website.

User data 23.

User data 23 may be a cookie or a similar piece of data, typically stored in the user's computing device 22. The computing device 22 may be any device or system used by the user to surf the Internet and to access Internet content. As such, the computing device may include a cellular telephone (a smartphone), a tablet, a laptop computer, or a personal computer as a few non-limiting examples. User data 23 may include data that characterizes the user, as well as the hardware and software used by the user's computing device 22. Therefore, typically, when a user 21 accesses a web-based content 14, the user's computing device, via the user data 23 and Internet address, has an affect or impact on the advertisements 17, as well as the form and look-and-feel of the advertisements 17 that are presented to the user 21. Two users access the same website may thus have a different online experience and, the same user may even have a different online experience when visiting the same website using a different computing devices 22, such as when using someone else's computing device.

When performing advertisement surveys, the advertisement survey system 11 may access content 14 located on a content server 13 as a virtual agent. The virtual agent emulates a user, such as user 21, typically by presenting the content 14 website with virtual agent data 24, typically emulating the user data 23. For example, when performing an advertisement survey, the advertisement survey system 11 accesses a plurality of content 14 websites, typically by using a plurality of different virtual agent data 24. The advertisement survey system 11 may present the accessed content 14 websites with a plurality of virtual agent Internet Protocol addresses (also known as Internet addresses, IP address, universal resource locator (URL), hyperlink, Internet link, or simply link). The virtual agent IP address may be the IP address of the particular survey server 18 accessing particular content server 13 containing a particular content 14.

It is appreciated that a particular content 14 may be provided by several content servers 13 and that accessing the particular content 14 from a different survey server 18, such as servers located in different geographical locations, may result in accessing a different content server 13, and thereafter contacting a different advertisement server 16 and receiving a different advertisement 17.

It is appreciated that different content servers 13 collect user data such as surf tracking data and terms of interest in different manners, methods, and/or mechanisms, and therefore providing different user information 21 to the respective advertising servers 16. Thus, to survey the advertising experience of a particular type of user, the survey server 18 should properly emulate the characteristics of the typical user as collected by the various content servers 13 and provided to the various advertising servers 16 in the form of user information 21. Hence the survey server 18 surfs the Internet in a particular, pre-planned order and/or manner, to provide the content servers 13 with the pre-planned particular data forming a user information package 22 adequately representing the typical user 21 whose advertising experience is surveyed.

It is also appreciated that a publisher may operate several content servers 13, websites, web pages, and content 14. Thus, content servers 13 and content 14 can be organized, characterized, identified and accessed (surveyed) according to their respective publishers. A publisher is typically characterized by company or brand name, market category or segment (vertical), related geography, etc.

Hereinafter, unless explicitly explained, the term virtual agent data 24 denotes all data characterizing the virtual agent, including the Internet address, user specific data collected by the visited website, (such as surf tracking data and terms of interest), and user data 23.

After presenting the virtual agent data 24 to the visited content server 13, the advertisement survey system 11, via its survey server 18, retrieves, stores and presents to a user the advertisements 17 presented to the virtual agent by the content server 13 within the advertisement placeholders 15 at the content 14 presented by the content server 13.

The advertisement survey system 11 also analyses the information retrieved from content servers 13 (the advertisements 17) with respect to the information presented to the content servers 13 (virtual agent data 24) to produce statistical advertising data and parameters. Such statistical advertising data may include measurements of the relative impact of a particular advertisement, or advertisement type on a particular visitor, as characterized by a particular virtual agent data 24. Advertisement impact may also include the frequency of the various advertisements, the relative frequencies, the share of voice, etc., all with respect to a particular type of visitor (as characterized by the respective virtual agent data 24).

Figure 2:
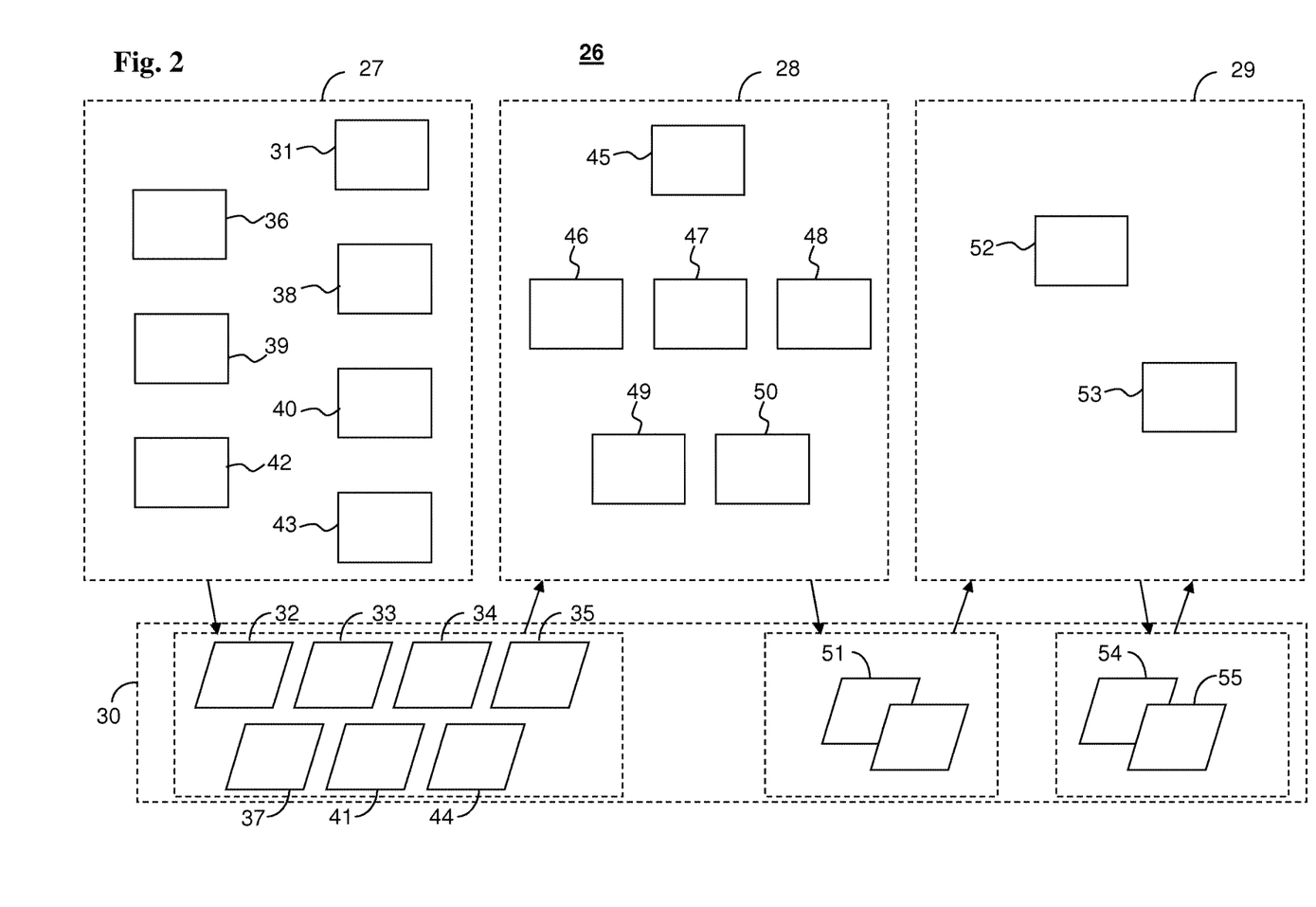
FIG. 2 is a simplified block diagram of software program for advertisement survey system.

Reference is now made to FIG. 2, which is a simplified block diagram of software program 25 for advertisement survey system 11 according to an exemplary embodiment.

As seen in FIG. 2, software program 25 may include the following components:

A human interface module 26.
A survey module 27.
An analyzing and reporting module 28.
A storage or database module 29.

Human interface module 26 may enable a user to set the parameters of an advertisement survey as described above, and further detailed below, typically using survey administration module 30. The parameters of an advertisement survey may include, but are not limited to, the following parameter groups: targeted user characteristics 31, targeted content websites 32, targeted advertisement characteristics 33, and targeted competitive advertisement data 34 and/or targeted placeholders 15.

Human interface module 26 enables a user to set targeted user characteristics 31 using survey administration module 35. Targeted user characteristics 31 may include, but are not limited to, technical parameters, surfing history, personal parameters, and survey parameters. Technical parameters include, but are not limited to, geographical locality (Geo-location) such as country, region, town, etc. of the user (user location), user or browser language, browser type (make, version, etc.), operating system type, screen size, access network speed (bit rate), etc. Surfing history includes, but is not limited to, referrer website, referrer keywords, etc. Referrer website is typically the site (or sites) visited prior to accessing the targeted content 14. Referrer keywords are the terms used by a search engine to locate a website or webpage (including referrer websites).

Personal data (or personal parameters, or user category) include, but are not limited to, gender, age or age range, level of education, income, salary or any other socio-economical characterization, fields of interests, and any other data associated with the content of websites and web pages searched or visited by the user in the past. Such data may be collected in cookies placed by the visited websites and then presented to advertising bidding engines. Personal data may be created by the virtual agent by visiting adequate websites and/or web pages prior to accessing the targeted content 14 website. Therefore, using the human interface module 26 to set the personal data may include setting a list of user-characterizing content-locations 36, which are websites (e.g. URLs) that the virtual agent should visit prior to accessing the content 14 web page.

Typically, a content 14 website collects the targeted user characteristics 31 (including technical parameters and the surfing history) from the accessing browser. The survey server 18 typically emulates the behavior of a normal browser and provides this data to the content 14 website in a form such as virtual agent data 24.

Targeted user characteristics 31 may also be named, or include, user behavioral data. Targeted user characteristics 31 are used to characterize and create virtual agents by providing virtual agent data such as virtual agent data 24 of FIG. 1.

Targeted user characteristics 31 may also include session length. Session length is typically the time the user spends visiting a particular website or webpage, as measured by the website. Some advertising methods may change the advertisement if the session length exceeds a certain threshold, such as 5 minutes.

Human interface module 26 also enables a user to set the parameters of targeted content websites 32 (destination Internet sites or pages) using website targeting module 37. Targeted content websites 32 refer to, but are not limited to, a list of content websites that should be visited and surveyed, or the characteristics of such targeted content websites. Such targeted content websites or web pages refer to content 14 hosted by content servers 13 of FIG. 1.

Targeted content websites 32 may be characterized and/or identified by their Domain (URL), a website title, and category or vertical (such as a vertical market). The targeted content websites 32 may be provided as a list of content locations such as Internet addresses of websites and/or web pages, Internet links to websites and/or web pages, and a universal resource locators (URL) of websites and/or web pages.

Alternatively, targeted content websites 32 can be selected or characterized according to the publisher or a characteristic of the publisher, such as company or brand name, market category or segment (vertical), related geography, etc.

Human interface module 26 also enables a user to set the parameters of targeted advertisement characteristics 33 using advertisement targeting module 38. Targeted advertisement characteristics 33 include, but are not limited to, an advertisement, or a plurality of advertisements, which impact should be measured. Typically, the targeted advertisement is published by the business entity that ordered the advertisement survey. Typically, such business entity is interested in measuring the impact of the targeted advertisement in relation to other advertisements presented to the targeted users.

Human interface module 26 also enables a user to set the parameters of targeted competitive advertisement 34 using competitive targeting module 39. Targeted competitive advertisement 34 data refers to data included in an advertisement presented to the user and characterizing advertisements other than the targeted advertisements. Targeted competitive advertisement 34 data may enable the advertisement survey system 11 to locate and identify each advertisement presented, and/or the advertiser, that is the entity that pays for the presentation of the advertisement to the user visiting the website. An advertiser may be characterized (for searching advertisements) and or identified (in a collected advertisement) according to parameters such as name and type, such as company name, brand name, market type, etc.

Targeted competitive advertisement 34 data may enable the advertisement survey system 11 to locate and identify other characteristics of the advertisement, such as technical parameters (i.e., object type, physical size and/or dimensions, digital size such as file size, and name). An object type typically identifies the medium used by the advertisement such as image, flash object, or JS object running rich media.

Targeted competitive advertisement 34 data may enable the advertisement survey system 11 to characterize an advertisement according to placement group. In a particular web page some advertisements can be related to a certain group of advertisements. Such a group can be characterized, for example, according to an advertising campaign. Typically, an advertiser takes over a particular advertising space and presents a group of advertisements related to the same campaign. Such takeovers are usually priced as premium channels by the publishers. Typically, an advertising campaign includes one or more advertisements leading to the same unique landing page. An advertising campaign may be characterized and identified by its name, category or market segment (vertical), a unique landing URL, a campaign title typically appearing in the landing page, a campaign group, etc.

Alternatively, there is no differentiation between targeted advertisements and competitive advertisement in the research phase, and the differentiation is made in the analysis and reporting phase. In this alternative, the targeted advertisement characteristics 33 module and the targeted competitive advertisement 34 module are (also) available in the analyzing and reporting module 28.

Human interface module 26 may also enable a user to set the parameters of the scope of an advertisement survey, typically using the survey administration module 30. The advertisement survey scope 40 refers to survey parameters such as, but not limited to:

The number of virtual agents and/or virtual agent types, such as virtual agent data 24 of FIG. 1, to be created.

The number of targeted content websites 32 to be visited.

Day and time in which the surveying virtual user should access the targeted content 14 website. This is usually provided by setting a list of days of the week, and/or a span of hours of the day, where the virtual agent should access the targeted content 14 website.

User characteristics such as geo-location and language.

Hardware and software characteristics associated with the user such as browser language, browser type, operating system type, screen size or resolutions, bandwidth of the user's access network, etc.

Referrer websites and keywords used by the user.

The required survey accuracy, typically referring to the accuracy of the statistical result, such as ad saturation value derived using ad saturation analysis, daisy chain analysis, etc.

Merging and splitting survey parameters.

Using report management module 41, the human interface module 26 may also enable a user to set the parameters of an advertisement survey report. The human interface module 26 may enable a user to select the measured parameters and the analyzed parameters to present to a user in an advertisement survey report, and the presentation manner and format.

As described above, an advertisement survey may have many parameters and the advertisement survey system 11 is expected to collect advertisement data for all the relevant combinations of the survey parameters. A cell may be a combination of search parameters. It is therefore useful to optimize the advertisement survey by using useful parameters. Useful parameters create cells providing different results. For example, two cells that provide the same results can be merged without loss of useful information. Similarly, if two cells provide very different results it may be useful to split the cells, increase the resolution of the survey, and thus increase the accuracy of the results. Merging and splitting survey parameters is therefore a method of survey optimization. Most of the survey parameters can be merged and split. For example, the geographical resolution (geo-location), the span of keywords, the number of time divisions (time-of-day spans) and most of all the number and variability of types of virtual agents.

As an option, an advertisement survey can be re-run repeatedly. An advertisement survey may be scheduled for periodical re-run, for example daily, or weekly, or monthly. A subsequent re-run can be optimized based on the results of the previous run. This means that some of the cells are merged and other cells are split. For example, assume a survey defined for 24 hours divided into six periods of 4 hours. Assume two periods provide the same results. These two periods (cells) can be merged. On the other hand, assume two periods provide results that are very different. These two periods (cells) can be split, for example, into four periods of two hours each.

Human interface module 26 may enable a user to set the parameters for merging and splitting survey parameters (cells) by setting rules and criteria for merging, splitting and resetting. For example, a merging rule uses the difference between particular results of two adjacent cells and the criterion is a difference value or percentage. If the difference is below the criterion the two cells are merged. For example, a splitting rule uses the difference between particular results of two adjacent cells and the criterion is a difference value or percentage. If the difference is above the criterion one or two of the cells are split. For example, after a predetermined period, or number of runs, merging and splitting are rest to the original setup. It should be appreciated that a level of hysteresis may also be employed by setting a lower criterion threshold for determining a merging event and an upper criterion threshold for determining a splitting event, such that the area between the two thresholds does not result in any action.

Alternatively, advertisement survey system 11 performs survey optimization, such as merging and splitting, on the fly, while a survey is being executed. As the results of the processes are collected and analyzed, survey parameters can be merged and split thus generating more or less processes and modifying the survey parameters assigned to these processes.

Human interface module 26 enables a user to define an optimization mechanism whereby advertisement survey system 11 optimizes an advertisement survey on-the-fly, or optimizes a repeated (next) advertisement survey when an advertisement survey is scheduled for periodical re-run. A user may use optimization setup module 42 to create or modify a set of optimization parameters 43. Optimization parameters 43 may include, but are not limited to, optimization algorithms, rules, criteria, and tools.

Algorithms refer to methods of analyzing and calculating results by which optimization is considered.

Rules refer to mechanisms for determining an event requiring optimization. For example:

Rules that determine which cells to compare (e.g. rules for selecting adjacent cells).

Rules that determine which algorithm to use to calculate the values to compare.

Rules determining the comparison method to use for determining a need for optimization. For example, by measuring a difference between results calculated by a particular algorithm for two cells of a particular type.

Criteria refer to the value, such as a threshold value, by which advertisement survey system 11 determines that optimization is required for a particular cell (e.g. split) or a plurality of cells (e.g. merge).

Tools refer to the method for applying optimization, such as merging cells, splitting cells, cell organization (e.g. hierarchical structure of cells), and rest conditions (i.e. when to reset the optimization and return to the original cell structure).

Survey module 27 may include:
Survey management module 44.
IP Hopping module 45.
Behavioral Content Discovery module 46.
Advertisements identification module 47.
Ad Saturation Analysis module 48.
Daisy Chain Analysis module 49.

The survey management module 44 manages a plurality of processes (task), where each process emulates a virtual agent. The processes are typically executed by one or more servers. A process may execute any number and/or combination of the modules of the survey module 27. A process may execute (perform) the Behavioral Content Discovery module 46.

The survey management module 44 uses data from the advertisement survey scope 40 to determine how many processes are necessary and how to manage the distribution of virtual agents among the processes. The survey management module 44 assigns to each process the relevant data to execute the Behavioral Content Discovery module 46 for a particular virtual agent. Such data may include data derived from the targeted user characteristics 31, the targeted content websites 32, the targeted advertisement characteristics 33, and the targeted competitive advertisement 34.

The IP hopping module 45 may be used by the survey management module 44 or by each of the surveying processes to determine the IP address to use when accessing a particular content server 13. The IP hopping module 45 selects the appropriate IP address according to the geographical locality (Geo-location) required to emulate the virtual agent, avoiding the use of the same IP address for virtual agents accessing the same content server 13, whether using the same or different virtual agent data 24.

The Behavioral Content Discovery module 46 produces the required virtual agent data 24 of the virtual agent and presents it to the content server 13. The Behavioral Content Discovery module 46 generates cookies, presents relevant keywords to search engines, visits particular websites, etc. in order to produce the agent data 24 and then enables the visited content server 13 to collect this data.

Then, the Behavioral Content Discovery module 46 collects from the visited content server 13 information regarding the visited placeholders 15, and the advertisements 17 presented to the virtual user within the visited placeholders 15. Information regarding the visited placeholders 15 may include size, relative position (in the page), object type, placement group, and display properties (such as floating, hovering, aligned, etc.)

The surveying process may then execute the advertisements identification module 47 to identify the various advertisements 17 collected from the visited content server 13. Ad Saturation Analysis module 48 and Daisy Chain Analysis module 49 are then used to further analyze the behavior of the advertising system. All the data collected and analyzed by each surveying process may be stored in the survey results database 50 of the storage or database module 29.

The analyzing and reporting module 28 includes a user interface module 51 and a data analysis and presentation module 52. User interface module 51 enables a user to enter research parameters 53 and view browse through the research results 54 presented by the data analysis and presentation module 52. The data analysis and presentation module 52 uses the research parameters 53 to create the research results 54.

Research parameters 53 may include one or more, or any combination of, parameters from the parameters set by the human interface module 26. For example; the research parameters 53 may include parameters of targeted user characteristics 31, parameters of targeted content websites 32, parameters of targeted advertisement characteristics 33, and parameters of targeted competitive advertisement data 34. Such parameters may include, but are not limited to, user behavioral data such as geographical locality (Geo-location) such as country, region, town, etc., user or browser language, browser type (make, version, etc.), operating system type, screen size, referrer website, referrer keywords, gender, age or age range, level of education, income, salary or any other socio-economical characterization, fields of interests, and similar data, day and time in which the surveying virtual user accessed the targeted content 14 website.

The data analysis and presentation module 52 analyzes the survey results database 50 according to the research parameters 53. Such analysis may include generating statistical results. The research results 54 generated by the data analysis and presentation module 52 may include the frequency (number) of advertisements 17 presented to virtual users according to the advertisement type or identification, and according to a particular virtual user characterization parameter or combinations of parameters. The research results 54 may also include relative frequencies (percentage) of advertisements 17 presented to virtual users according to the advertisement type or identification, and according to virtual user characterization parameters or combinations of parameters. For example, such relative frequency include share-of-voice of a particular advertisement regarding a particular selection of user characteristics (including location, day-of-week, time-of-day, etc.).

It is therefore appreciated that the advertisement survey system 11 surveys the advertisement survey environment 10 using a method of behavioral content discovery, to collect and present advertisement data (the discovered content) according to user-selected (referring to the researching user) user behavioral characteristics (referring to the content visiting user).

The user behavioral characteristics refer to data selected or entered by the researching user using the human interface module 26 (and presented to the visited content server 13 as virtual agent data 24) and/or the user interface module 51. The advertisement data (or the discovered content) refers to advertisements 17 as collected by the advertisement survey system 11 and stored in survey results database 50 and/or presented to the researching user as research results 54.

Figure 3:
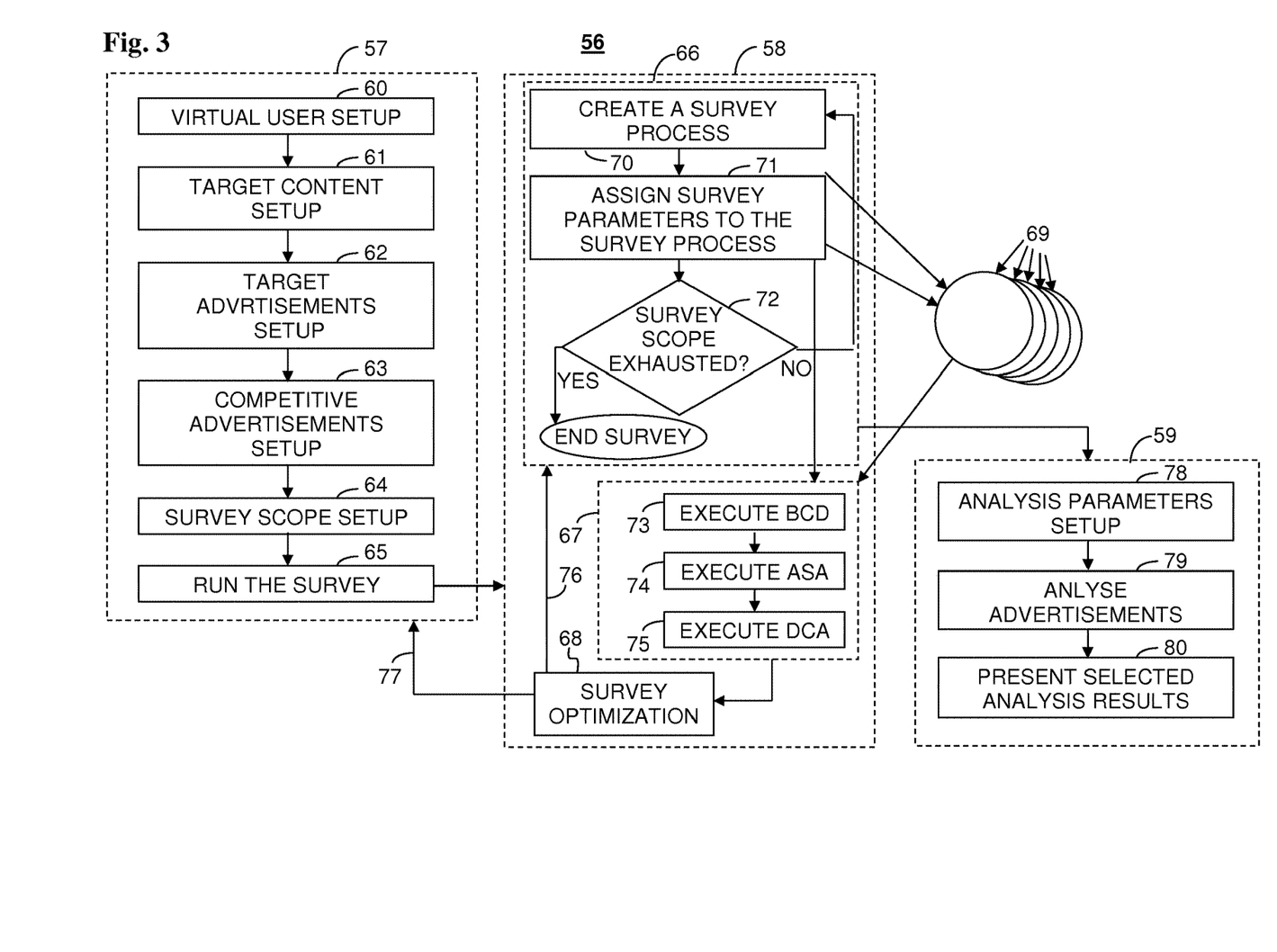
FIG. 3 is a simplified flow chart of process 1 implementing the advertisement survey method.

Reference is now made to FIG. 3, which is a simplified flow chart of process 55 implementing the advertisement survey method according to an exemplary embodiment.

As seen in FIG. 3, process 55 may execute software program 25 and may include the following actions:

Setting the survey parameters 56.
Executing the survey 57.
Analyzing and reporting survey results 58.

In action 56 of process 55, a researching user prepares advertisement survey system 11 to execute a survey of Internet advertisements. The user may access human interface module 26 to set up the survey parameters. The user, executing process 55, may perform one or more of the following steps (details of these parameters are described above):

Setting or selecting a virtual user (step 59)
Setting or selecting target content such as content servers 13 and/or content 14 (step 60).
Setting or selecting target advertisements (step 61).
Setting or selecting competitive advertisements (step 62).
Setting or selecting the scope of the survey (step 63).

After completing the survey setup, the researching user instructs advertisement survey system 11 to execute a survey (step 64), thus invoking action 57.

In action 57, advertisement survey system 11 executes the survey in three main parts (or modules) designated in FIG. 3 by numerals 65, 66, and 67. In part 65 the advertisement survey system 11 supervises a plurality of survey processes (tasks) 68. Each survey process 68 may emulate a particular virtual agent accessing a content server 13 and/or content 14. The advertisement survey system 11 creates a survey process 68 (step 69), and assigns appropriate survey parameters to the survey process 68 (step 70). Steps 69 and 70 are repeated for all survey processes 68 until all the survey parameters (such as virtual agents, content server 13 and/or content 14) are assigned to survey processes 68 (step 71).

Part 66 of action 57 of process 55 may be executed by each survey process 68. In Part 66, a survey process 68 executes at least one of the steps of Behavioral Content Discovery method (step 72), the Ad Saturation Analysis (step 73), and the Daisy Chain Analysis method (step 74).

Part 66 of action 57 of process 55 is typically a survey optimization process, typically executed by the supervising task executing part 65, or, alternatively, by a separate task. Part 67 optimizes the current advertisement survey (via 75) or the next survey (via 76) as necessary and/or possible. Part 67 may optimize the current advertisement survey by merging and splitting survey parameters (cells) as described above.

If the survey parameters are modified on-the-fly (via 75) part 65, and particularly process 70, may create new tasks and assign them the new or modified parameters to improve the accuracy of the survey results. On-the-fly optimization is particularly useful when parameters (cells) are split, increasing the resolution of the survey where necessary. Thus, a survey can start with relatively low resolution and automatically increase the resolution on-the-fly, while being executed. The advertisement survey system 11 may therefore be capable of automatically and continuously adapting the survey resolution (cell size) according to the survey results and the predetermined accuracy.

Process 55 may then proceed to action 58, where a researching user conducts the analysis of the data collected by the advertisement survey system 11 in step 57 according to the survey parameters and methods selected in step 56, and then reviews the analysis results.

Executing action 58 of process 55 first enables the researching user to select the analysis parameters (step 77). Within this step the researching user may then select any combination of parameters such as the parameters used for determining the advertisement survey in step 56. Such parameters may be:

User behavioral data including targeted user characteristics, targeted content websites, targeted advertisement characteristics, and targeted competitive advertisement data.

User behavioral data or targeted user characteristics may include technical parameters, surfing history, personal parameters, and survey parameters.

Technical parameters may include geographical locality (Geo-location), type of the terminal used by the user, operating system type, screen size, browser type, user's or browser's language, etc.

Surfing history typically includes referrer website, referrer keywords, etc. gender, age or age range, level of education, income, salary or any other socio-economical characterization, fields of interests, and any other data associated with the content of websites and web pages searched or visited by the user in the past.

The researching user may also select a time frame in which advertisements were recorded by the advertisement survey system 11 in step 57. The time frame may include time of day and/or day of the week, etc. in which the analyzed advertisements were recorded.

The researching user may also select a list or a type of targeted content websites from which advertisements recorded by the advertisement survey system 11 in step 57 should be analyzed in step 78.

The researching user may also select one or more targeted advertisement and one or more targeted competitive advertisement.

Action 58 may then proceed to step 78 to analyze the data in survey results database 50 according to the parameters selected in step 77, and eventually, in step 79, process 55 presents the results of the analysis to the researching user.

It should be appreciated that the results of the advertisement survey include relations and/or associations between characterization parameters such as described above with respect to the parameters a user may set using human interface module 26, and/or the parameters described with respect to table 1 below.

It should also appreciated that the user using the advertisement survey system 11 to analyze and present the results of an advertisement survey may select one or more of the characterizing parameters such as the parameters presented in Table 1, and request the advertisement survey system 11 to present results associated with one or more other parameters of table 1. It is appreciated that such results associating two or more parameters may be calculated and presented as statistical parameters and/or distributions.

A user of advertisement survey system 11 may therefore, for example, select one or more user-characterizing parameters, and/or one or more advertisement-characterizing parameters and instruct the system to present one or more advertisement-characterizing parameters associated with the user-characterizing parameters, or user-characterizing parameters associated with the advertisement-characterizing parameter. Alternatively the system may present one or more statistical parameters calculated for the advertisement-characterizing parameters associated with the user-characterizing parameters, and/or one or more statistical parameters calculated for the user-characterizing parameters associated with said the advertisement-characterizing parameters.

Figure 4:
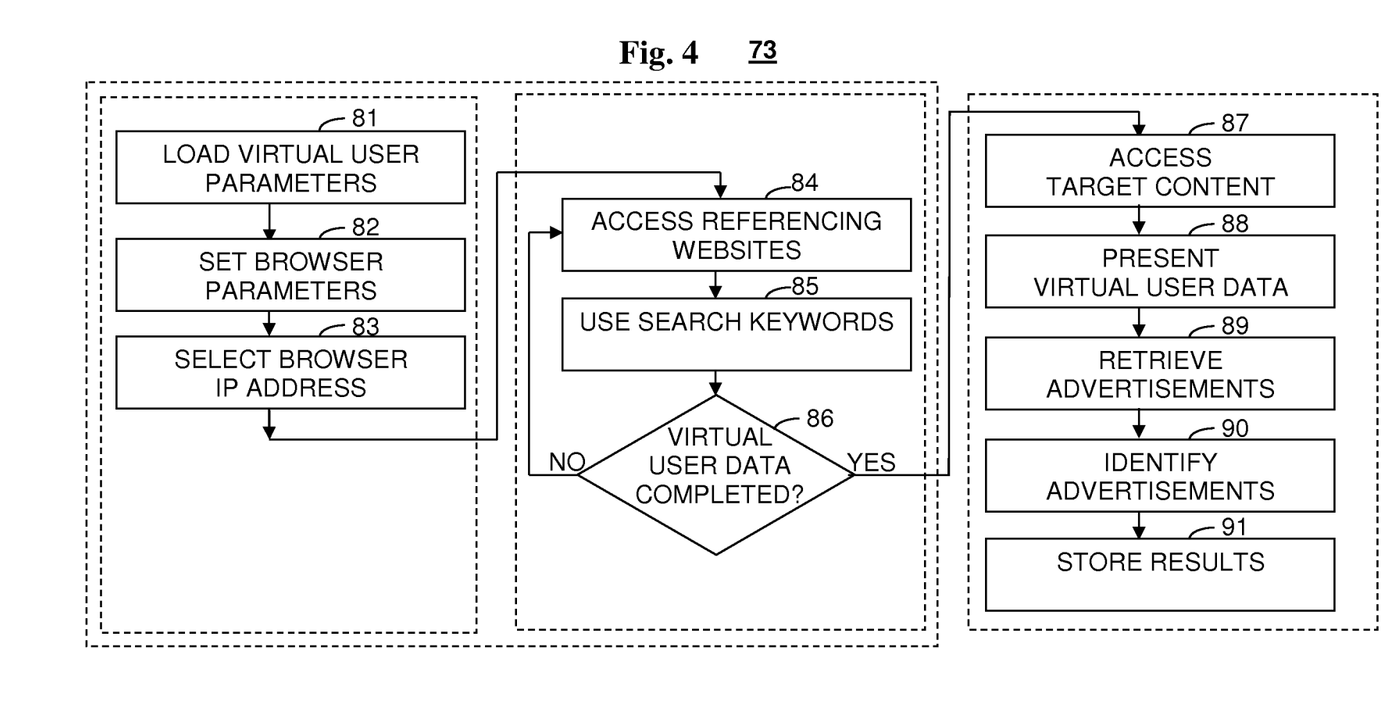
FIG. 4 is a simplified flow diagram of a module for implementing Behavioral Content Discovery method by a survey process.

Reference is now made to FIG. 4, which is a simplified flow diagram of a module for implementing Behavioral Content Discovery method (step 72) by a survey process 68, according to an exemplary embodiment.

A survey process 68 performing the Behavioral Content Discovery method (step 72) may start by loading the virtual user parameters assigned to it (step 80). Survey process 68 may then set the parameters of the browser, or browser emulation module it uses (step 81).

Survey process 68 may then proceed to select an IP address (or proxy) according to the geo-location assigned to the virtual user it is emulating (step 82). This IP address or proxy serve as a user-characterizing IP-address. When the visited website or webpage detects this IP address it also identifies the geo-location associated with the IP-address and hence associates the virtual agent with that geo-location.

Survey process 68 may then proceed to develop the required characteristics of the virtual user it is emulating, typically by accessing one or more referencing content-location such as websites and webpages (step 83), and using selected search keywords, if applicable (step 84). Steps 83 and 84 may be repeated until the characterization of the emulated virtual agent is completed (step 85).

Survey process 68 may then proceed to access a selected content server 13 and/or content 14 (step 86) as assigned to it in step 69. Survey process 68 may then proceed to present the emulated virtual user information to the accessed content server 13 and/or content 14, typically using one or more data structures comprehensible by the targeted content site (step 87).

Survey process 68 may then proceed to collect from the accessed content server 13 and/or content 14 the advertisement 17 presented to the virtual user (step 88). Survey process 68 may then proceed to identify advertisement 17 (step 89) and store them in storage or database module 29 (step 90).

Therefore, using the system and method described above, the advertisement survey system 11 can research and analyze the advertisement survey environment 10. Advertisement survey system 11 may operate a plurality of servers, accessing a plurality of content sites, using a plurality of virtual agent data, typically at least partially concurrently.

Advertisement survey system 11 may enable a researching user to analyze the impact of a particular advertisement with respect to any other selection of advertisements, or advertisement types, and in regard of any number of types, or characterizations, of visiting users. The impact of an advertisement on the visiting user may be measured as the number of visiting users exposed to a particular advertisement relative to the total number of advertisements presented to a particular type of visiting user. The impact of a particular may be also measured with respect to advertisements of a particular type or any other characterization.

Hence, the researching user can use the advertisement survey system 11 to study the potential impact of a particular advertisement, or advertising concept, if provided within the current state and offering of the advertisement environment 10. The researching user can use the advertisement survey system 11 to study the potential impact of such proposed advertisement with respect to any selected type or characterization of a visiting user surfing the advertisement environment 10.

Furthermore, the researching user can use the advertisement survey system 11 to study possibilities for segmenting the population of visiting users to assess the potential advertising impact value for the proposed segmentation and to optimize it. The segmentation of the visiting users refers to the selection, or grouping, of the users' characteristics. Such segmentation may include, but is not limited to, age, gender, geo-location, language, socio-economic characteristics, fields of interest, web surfing history, etc.

Moreover, the advertisement survey system 11 enables the researching user to execute an advertisements survey of the advertisement environment 10 according to a first set of parameters (i.e. survey parameters provided by the researching user in step 56) and then to analyze the survey results according to a second set of parameters (i.e. analysis parameters provided by the researching user in step 77).

Thereby, the advertisement survey system 11 analyses the manner in which advertising servers 16 operate. Particularly, the advertisement survey system 11 analyses the set of advertising rules by which advertising servers 16 publish advertisement 17 to various users. Advertisement survey system 11 imitates a large amount of virtual users with different profiles and collect all the data these presented to these virtual users. Thereby, the advertisement survey system 11 analyses the rules connecting the advertising rules with the various user profiles, typically by finding data patterns. Table 1 is an example of data presented by the advertisement survey system 11 to a content server 13, and data collected by advertisement survey system 11 from the content server 13.

TABLE 1

| Entity | Property | Data (example) |
| --- | --- | --- |
| User | Geo Location | 202.53.15.132 |
|  | Browser Language | English |
|  | Browser Type | Internet Explorer 7 |
|  | OS Type | Windows XP SP2 |
|  | Screen resolution | 1024 × 840 |
|  | Net Speed | 134 kbs |
|  | Referrer - Key word | Free money |
|  | Referrer - Website | Google.com |
|  | Session Length | 00:02:13 |
| Website | Domain (URL) | www.freemoney.com |
|  | Title | Free money! |
|  | Category/Vertical | Gambling/Games |
| Web Page | URl | /Gamblehere.html |
| Ad Placement | Size | 250 × 250 |
|  | Relative Position | Top |
|  | Object Type | Flash |
|  | Placement Group | 2 |
|  | Display Properties | float |
| Publisher | Name | Free Money Inc. |
|  | Category/Vertical | Gambling/Games |
|  | Geography | USA |
| Network | Name | Zanox |
|  | Type | Ad-network |
|  | Redirection URL | http://ad.zanox.com/?p=1 |
|  | Category/Vertical | Gambling/Games |

TABLE 1-continued

| Entity | Property | Data (example) |
|---|---|---|
| Advertiser | Name | 888 games |
|  | Type | 888 ltd. |
| Campaign | Name | Free $50 to spend! |
|  | Category/Vertical | Gambling/Games |
|  | Landing URL | www.games.888.com/free_m |
|  | Title | Free $50 to spend! |
|  | Group | 5 |
| Targeting Plan | Day(s) of week | Sunday |
|  | Hour(s) of the day | 24 h |
|  | User Freq. Cap | Static |
|  | Geo Targeting | USA |
|  | Language Targeting | English |
| Creative | Type | Flash |
|  | Dimensions | 250 × 250 |
|  | File Size | 85 kb |
|  | Name | 250_250_fg_1.swf |

Figure 5:
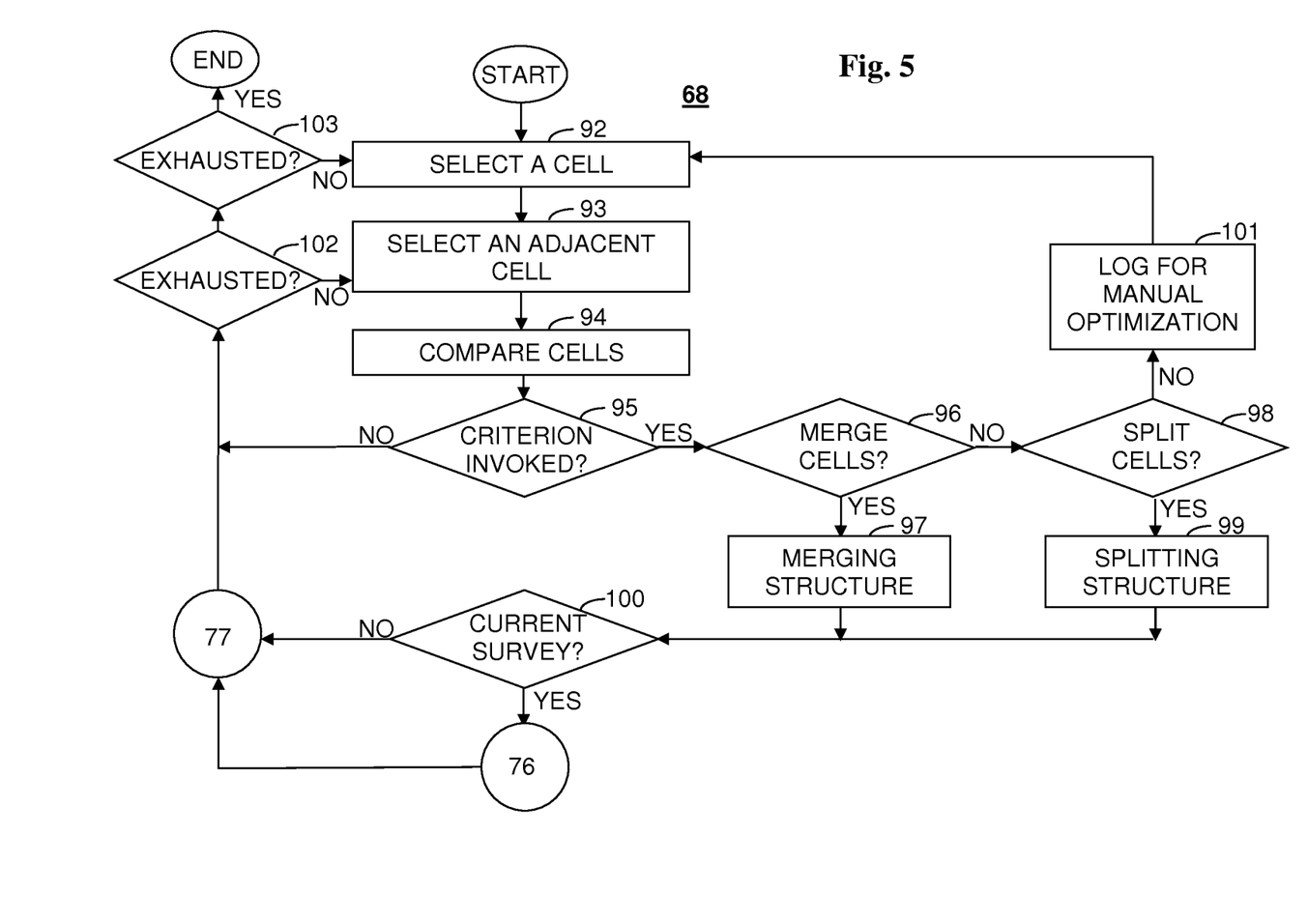
FIG. 5 is a simplified flow diagram of a process for optimizing an advertisement survey by merging and splitting survey parameters.

Reference is now made to FIG. 5, which is a simplified flow diagram of part 67, according to an exemplary embodiment.

The flow diagram of FIG. 5 is an example of an optimization process by which Advertisement survey system 11 optimizes the cell structure of an advertisement survey, and thereby the processing of the advertisement survey. It is appreciated that other means and methods for survey optimization are also possible and contemplated.

As shown in FIG. 5, the software module of part 67 starts at step 91 by selecting a first cell. A cell is typically a particular survey parameter or a particular combination of two or more survey parameters. Part 67 then proceeds to step 92 to select a second cell typically being adjacent to the first cell. An adjacent cell has the same combination of survey parameters with one (or more) survey parameters having values adjacent to the values of the first cell. An adjacent cell may be selected using one or more rules for selecting an adjacent cell as defined by the user using optimization setup module 42.

For example, an adjacent value may be an adjacent time period, such as adjacent time-of-day period, adjacent day-of-the-week, adjacent age range, etc. For example, an adjacent value may be an adjacent space such as adjacent geo-location, adjacent IP address, etc. Adjacent values or value range may be network bitrates, screen size, etc. Adjacent values may also refer to qualitative aspects associated with user characteristics such as keywords, referral sites, etc.

Cells, or cell parameters can be grouped, for example in a hierarchical manner, to provide neighboring (adjacent) values within a group, and adjacent groups. For example, Targeted competitive advertisements can be grouped according to market segments, or further in a hierarchical segmentation structure. Similarly, user characteristics can be organized in groups, and typically in a hierarchical structure.

Organization of survey parameters in hierarchical structure enables merging and splitting of parameters according to the hierarchical structure. Therefore, parameters such as targeted user characteristics can be organized in one or more overlapping hierarchical structure, where each such hierarchical structure organizes the same parameters in slightly different groups. This enables splitting parameters (and cells) according to one hierarchical structure and then merging parameters (and cells) according to another hierarchical structure.

Part 67 may then proceed to step 93 to compare the selected cells using algorithms, rules and criteria as defined in optimization parameters 43 as defined by the user using optimization setup module 42. If a criterion is invoked (step 94), for example, if the comparison (step 93) results in a threshold being surpassed, then part 67 may determine if the cells are to be merged (steps 95 and 96), or split (steps 97 and 98).

Part 67 may then proceed to step 99 to determine if the optimization applies to the current survey or to the next survey and proceeds accordingly via 75 or 76 of FIG. 3.

If (according to steps 95 and 97) automatic merging and splitting is inappropriate the result may be logged (step 100) for manual optimization.

The above process may be repeated until the relevant adjacent cells are exhausted (step 101) and until all cells (or cell pairs) pending optimization are exhausted (step 102).

In this way advertisement survey system 11 performs a method for optimizing the advertisements survey by selecting an optimal set of cells. This optimization process can be also viewed as automatic profiling, in which the optimal set of user profiles (user characteristics) is created. One of the goals of the optimization is to perform the advertisements survey on the smallest number of cells while preserving the targeted survey coverage and accuracy.

A different way of describing this method of optimizing advertisements surveys is by adapting the cell resolution to the variability of the results. The plurality of cells as defined for a particular advertisements survey defines the coverage, or space, of the advertisements survey. The optimization process adapts the size of the cells according to the variability of the results so that in parts of the survey space where variability is low the cells are larger, and in parts of the survey space where variability is high the cells are smaller. Thus a high accuracy is preserved while reducing the number of cells surveyed. One possible way of measuring the survey accuracy is according to the distribution of the variability of the results between cells.

The method for optimizing a survey of advertisements as described above may include the following steps:

A. Receive a plurality of content locations and a plurality of user data, wherein each pair of content location and user data defines a cell.

B. Survey a cell by accessing a content location from an Internet server and presenting the user data to the content location.

C. Retrieving one or more advertisements from the content location forming a result for the surveyed cell.

D. Repeat steps b and c for a first plurality of cells;

E. Compare the results of the first plurality of cells forming a distribution of comparisons;

F. Select a second plurality of cells according to one distribution of said comparisons of cells; and G. Repeat steps b and c for the second plurality of cells.

The second plurality of cells may provide a better accuracy of the advertisement survey. In this aspect the accuracy may be defined according to one range of differences between various survey results associated with adjacent cells. From another aspect, the second plurality of cells provides a better distribution of the cells of the advertisement survey. From yet another aspect, the second plurality of cells provides via the process described above, provides an adaptive resolution of the cells of the advertisement survey. In this case, the size, or resolution, of at least part of the cells is adapted according to the preferred accuracy of the results.

Adaptive resolution, as described, adapts the cell size according to the difference in one or more results obtained from adjacent cells. In one form of adaptation, if the difference is larger than a predetermined threshold value, the size of the cell may be reduced (higher resolution) to reduce the difference. If the difference is below a predetermined threshold value, the size of the cell may be increased (lower resolution) to increase the difference. In another form of adaptation, the initial resolution is relatively low, and if the difference is smaller than a predetermined threshold value the size of the cell may be reduced (higher resolution) to trace minute variations of the survey results.

As described above, changing the size of a cell may be performed by merging or splitting one or more adjacent cell dimensions. A cell dimension in this respect is a particular characteristic of the cell, such as a characteristic of the virtual user as described above. A cell dimension may include a sequence of values, or a sequence of ranges of values, or a sequence of collections of values, of the particular characteristic of the cell, or the virtual user. Changing the cell size (or cell resolution) may be performed by merging or splitting adjacent values, or ranges of values, or collections of values. The contents of a cell dimension (e.g. values, ranges of values, collections of values) may be arranged in a hierarchical structure to simplify the merging and splitting.

For example, assume an advertisement survey for advertising in sport-related websites. To simplify the example the survey cells have three dimensions: geo-location, sport type, and age group and the criterion is the number of advertisements in the cell.

Figure 6:
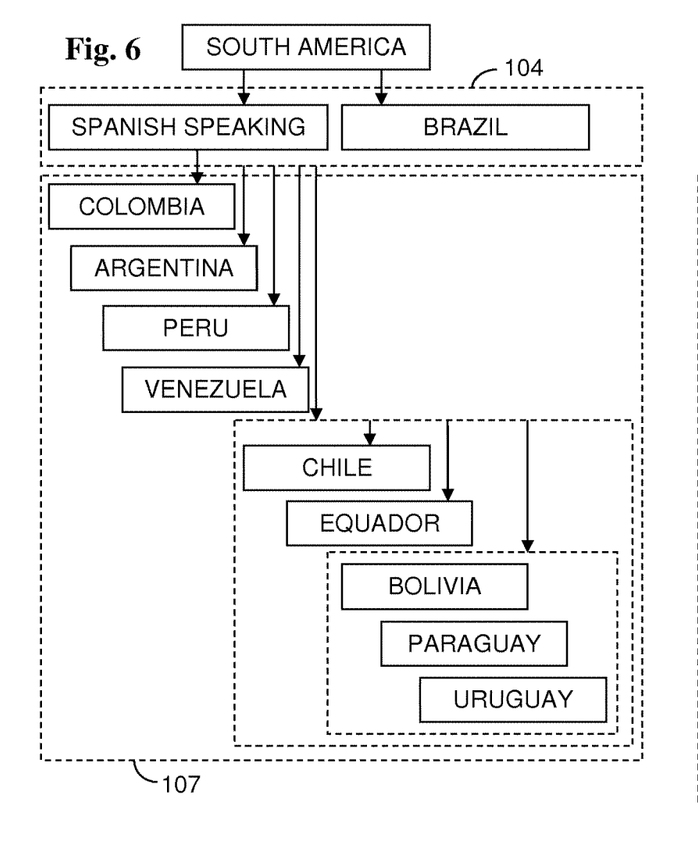
FIG. 6 is a simplified block diagram of hierarchical structures of geo-locations.
Figure 7:
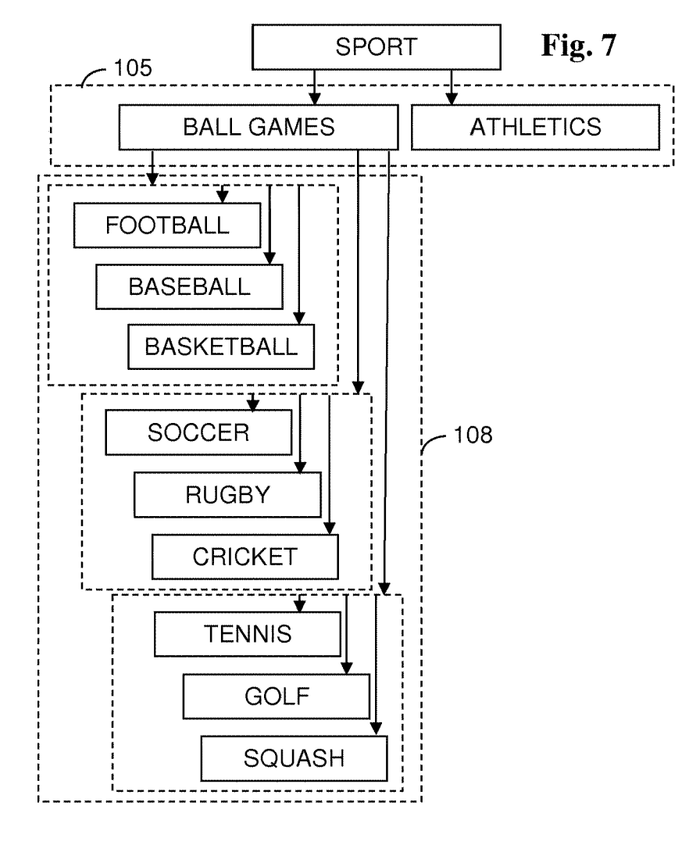
FIG. 7 is a simplified block diagram of hierarchical structures of sport types.
Figure 8:
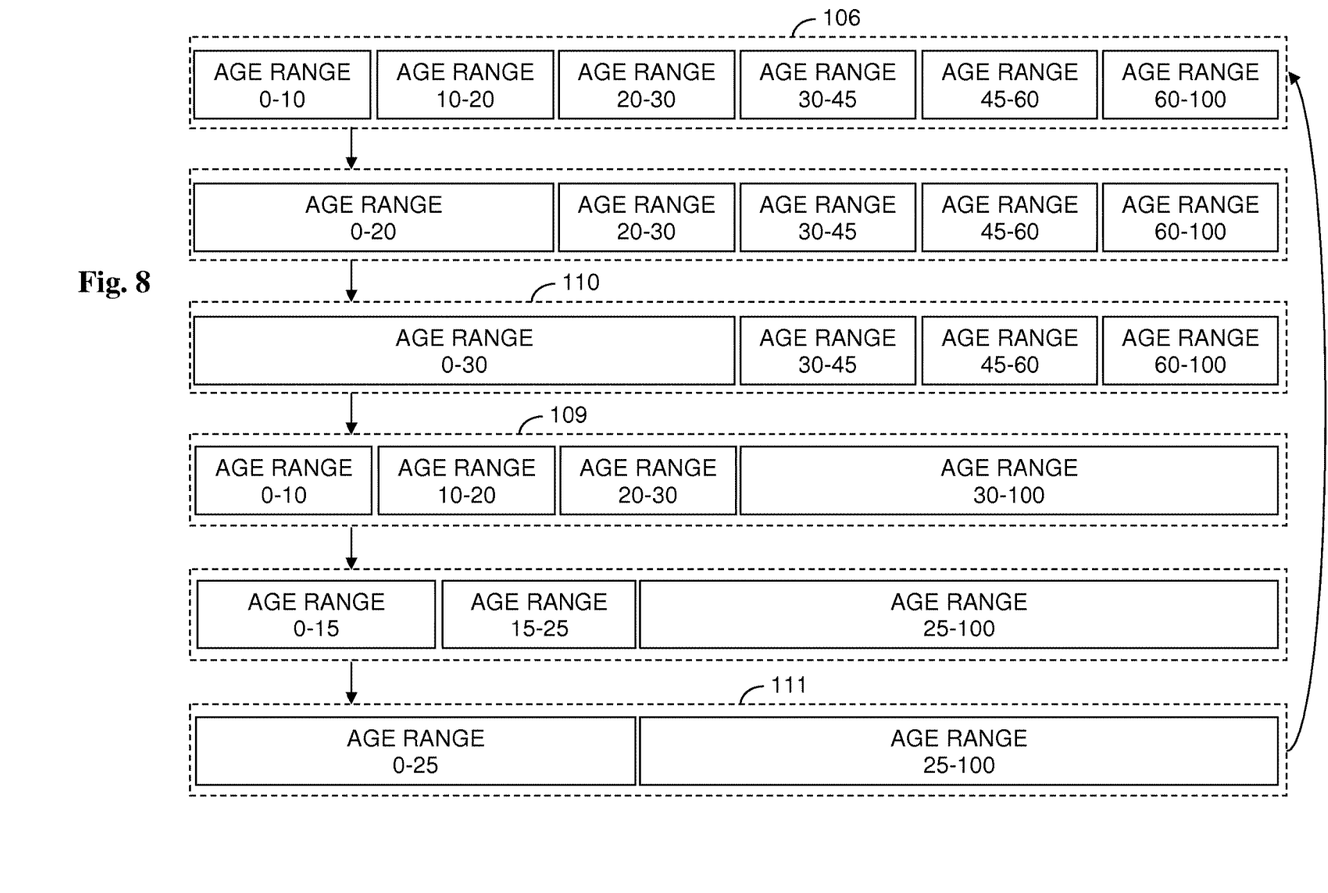
FIG. 8 is a simplified block diagram of hierarchical structures of age ranges, according to an exemplary embodiment.

Reference is now made to FIG. 6, which is a simplified block diagram of hierarchical structures of geo-locations, to FIG. 7, which is a simplified block diagram of hierarchical structures of sport types, and to FIG. 8, which is a simplified block diagram of hierarchical structures of age ranges, according to an exemplary embodiment.

Following the current example, the survey starts with a coarse resolution using levels 103, 104 and 105 of FIGS. 6, 7 and 8, respectively. There are therefore 24 cells: each having three dimensions:

Geo-location dimension with two options of Spanish-speaking countries and Brazil.

Sport dimension with two options of ball-games and athletics

Age dimension with six age range options.

The survey results show that the largest difference between the cells is the number of advertisements for the Spanish speaking countries being much larger than the number of advertisements for Brazil, and that this difference is higher than the high-difference threshold. Therefore the geo-location dimension may be split by selecting the next lower level 106 having 5 options (Colombia, Argentina, Peru, Venezuela and the rest). The total number of geo-location options is now 6 and the number of cells is now 72.

The subsequent survey results show that the largest difference between the cells is the number of advertisements for Sport, being much larger for ball games than athletics and higher than the high-difference threshold. Therefore the sports dimension is split by selecting the next lower level 107 having 4 options (athletics, and three groups of ball games). The total number of cells is now 144.

The subsequent survey results show that the largest difference between the cells along the age dimension is below the low-difference threshold for some cell pairs. The age dimension is therefore rotated between the age range options settling on age-range option 108 for soccer, age-range option 109 for golf, and age-range option 110 for the rest of the sport options. We now have 6 geo-location options, 6 sport options (athletics, soccer, tennis, golf, squash and the rest of the ball games), and 2 age-range options except for soccer and golf having 4 age-range options each. Altogether we have 96 cells (6×4×2+6×2×4).

The subsequent survey results show that the difference between tennis and squash is below the low-difference threshold and therefore these cells are merged, for example by not using virtual users characterized for squash. This reduces the total number of cells to 84 cells (6×3×2+6×2×4).

It is expected that during the life of this patent many relevant means and methods for online (Internet) advertising will be developed and the scope of the terms herein, particularly of the terms "advertising impact" and "share of voice", is intended to include all such new technologies a priori. Additional objects, advantages, and novel features of other possible embodiments will become apparent to one ordinarily skilled in the art upon examination of the following examples, which are not intended to be limiting. Additionally, each of the various embodiments and aspects as delineated hereinabove and as claimed in the claims section below finds experimental support in the following examples.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A computer-implemented method executed by an internet server for surveying advertisements for a virtual user, the method comprising the steps of:
   using a first user-interface of said internet server, by a first user, over a network, said first user-interface enabling said first user to provide said internet server with data comprising:
   at least one content location, said content location being at least one of an internet address, an internet link, and a universal resource locator (URL); and
   at least one user location for said virtual user, said user location comprising a selected geographical location; and user data for said virtual user, said user data comprising at least one of:
   characteristics of said virtual user; and behavioral data of said virtual user; using a second user-interface of said internet server, by said first user, over a network, said second user-interface enabling said first user to cause said internet server to perform the following actions;
   access from said internet server a particular destination internet site, wherein the particular destination internet site is selected from a plurality of destination internet sites based at least in part on said content location;
   select, by said internet server, content from said particular destination internet site, wherein the content comprises advertising placeholders and selecting an advertising server from which to obtain advertising content for each of the advertising content placeholders, wherein the advertising server, the content and the advertising content is selected based at least in part on the content location, the selected virtual user location and the virtual user data;

receiving content on behalf of said virtual user, said received content being associated with the content location and the selection of the content is not under the control of the first user;

at least one of storing said content received on behalf of said virtual user; and analyzing the content received on behalf of said virtual user to identify the impact of changing virtual user parameters has on the content, forming analysis results; and using a third user-interface of said internet server, by said first user, over a network, said third user-interface enabling said first user to cause said internet server to present to said first user, a least one of:

content received on behalf of said virtual user, and said analysis results.

2. The method for surveying advertisements according to any of claim 1, wherein said presenting said content additionally comprises the steps of: receiving from said first user at least one value for at least one parameter; and presenting said content to said first user according to said at least one parameter.

3. The method for surveying advertisements according to any of claim 1 additionally comprising the steps of: receiving from said first user at least one user-characterizing content-location for said virtual user; and accessing said at least one user-characterizing content-location before said step of accessing said content location.

4. The method for surveying advertisements according to any of claim 1 additionally comprising the steps of: receiving from said first user at least one referencing content-location; and accessing said at least one referencing content-location before said step of accessing said content location.

5. The method for surveying advertisements according to any of claim 1 additionally comprising the steps of: receiving from said first user at least one keyword; receiving from said first user at least one referencing content-location; accessing said at least one referencing content-location; and presenting said at least one keyword to said at least one referencing content-location; wherein said steps of accessing said at least one referencing content-location and presenting said at least one keyword to said at least one referencing content-location are performed before said step of accessing said content location.

6. The method for surveying advertisements according to any of claim 1 additionally comprising the steps of: receiving from a user at least one user-characterizing IP-address; and accessing said content location via said at least one user-characterizing IP-address.

* * * * *